United States Patent [19]

Buswell

[11] Patent Number: 5,598,963
[45] Date of Patent: Feb. 4, 1997

[54] BODY MOUNTED CAMERA SUPPORT ASSEMBLY

[76] Inventor: Brian Buswell, Rte. 1, P.O. Box 2440, Show Low, Ariz. 85901

[21] Appl. No.: 466,618

[22] Filed: Jun. 6, 1995

[51] Int. Cl.[6] .................................................. A45F 3/00
[52] U.S. Cl. ......................... 224/664; 224/660; 224/908
[58] Field of Search .................................. 224/229, 908, 224/242, 271, 225, 252, 272, 669, 660; 352/243; 354/74, 81, 82, 293

[56] References Cited

U.S. PATENT DOCUMENTS

| | | |
|---|---|---|
| 817,207 | 4/1906 | Wheeler . |
| 2,290,307 | 7/1942 | Wicker . |
| 2,298,144 | 10/1942 | McNabb . |
| 2,552,205 | 5/1951 | Moss ........................................ 224/908 |
| 2,771,826 | 11/1956 | Shapiro . |
| 2,952,200 | 9/1960 | Welch . |
| 4,158,490 | 6/1979 | Gottschalk et al. ..................... 352/343 |
| 4,327,986 | 5/1982 | Carter ...................................... 354/293 |
| 4,348,034 | 9/1982 | Welt ........................................... 280/35 |
| 4,687,309 | 8/1987 | Breslau .................................... 354/82 |
| 4,826,187 | 5/1989 | Abbott et al. ............................ 280/35 |
| 4,991,758 | 2/1991 | Eaneff ...................................... 224/908 |
| 5,064,062 | 11/1991 | Miller .................................. 206/316.2 |
| 5,172,838 | 12/1992 | Rowell et al. .......................... 224/908 |

*Primary Examiner*—David J. Walczak
*Attorney, Agent, or Firm*—Dowell & Dowell

[57] ABSTRACT

An assembly for supporting a camera from an individual's body includes a storage case having an adjustable body encircling belt and a unipod stand having a vertically adjustable camera engaging portion. A mounting track is mounted to the storage case and the unipod stand includes a mounting base for engaging the mounting track to secure the unipod stand to the storage case. When mounted to a storage case supported from an individual's body, the individual's hands are free to adjust the camera and perform other tasks.

11 Claims, 4 Drawing Sheets

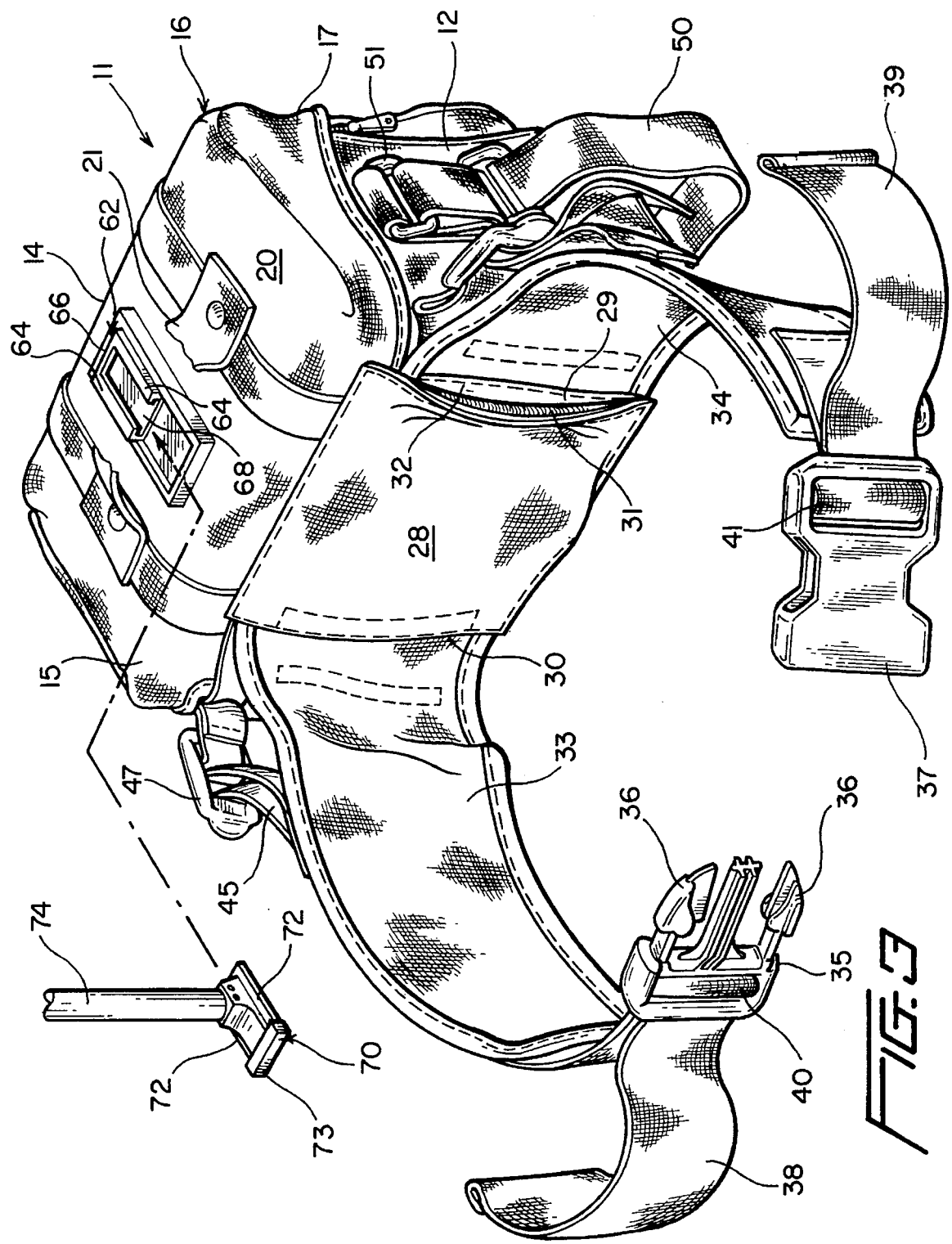

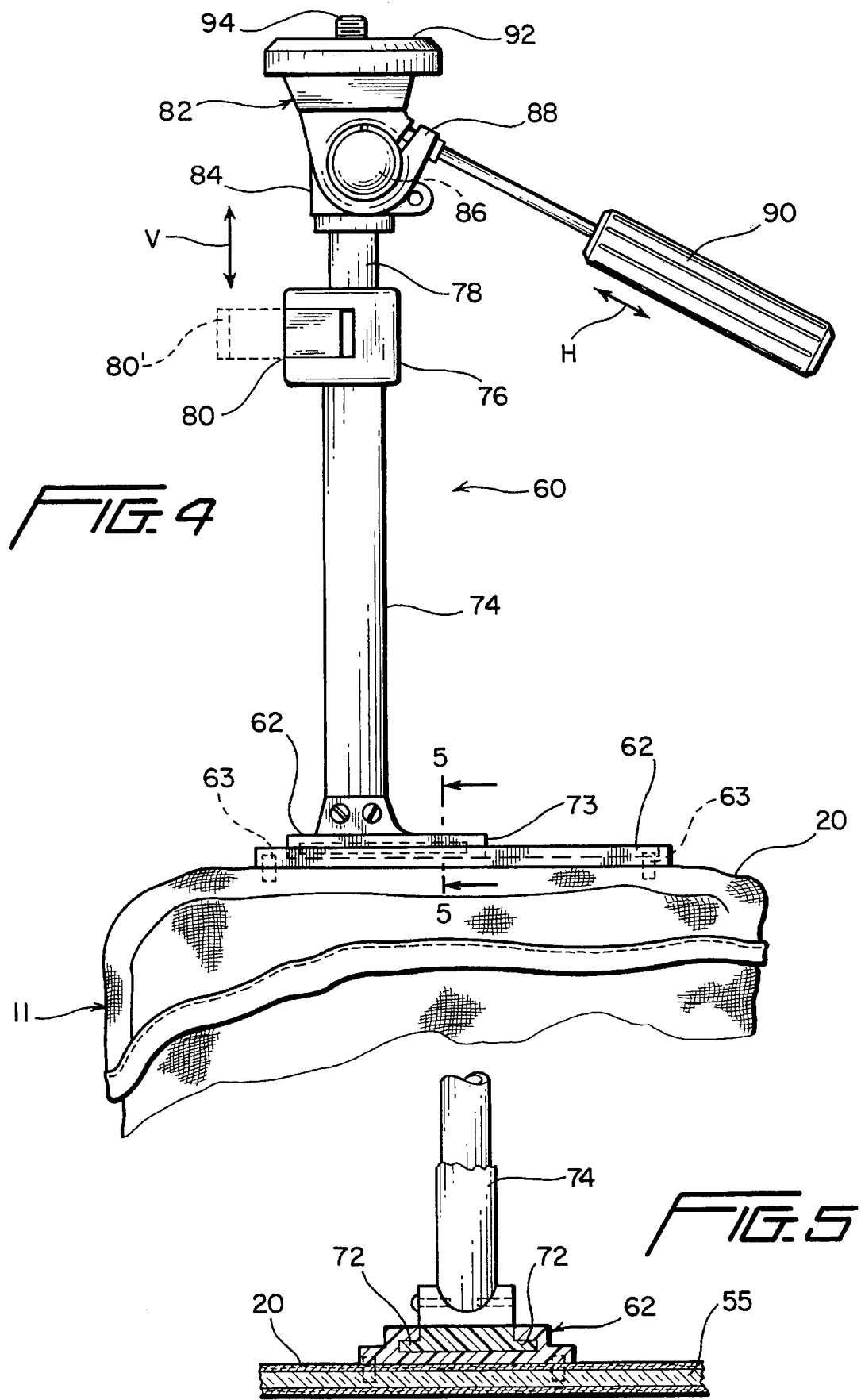

BODY MOUNTED CAMERA SUPPORT ASSEMBLY

BACKGROUND OF THE INVENTION

1. Field of the Invention

This invention is directed to the field of supports utilized for stabilizing cameras during their use and, more particularly, to a camera support suitable to be worn by a photographer so that his or her hands are free for manipulating the camera or performing other tasks.

2. History of the Related Art

An important consideration in the use of all types of cameras including still photograph cameras, movie cameras, and VCR cameras, is maintaining the cameras in a steady position while pictures are being taken. Camera supports comprised of one or more legs are known. The known supports include types which are used on fixed surfaces, such as the well known tripods, and other devices for facilitating the use of a camera being carried by a photographer.

The latter known devices may provide some degree of stabilization for the camera by allowing the weight of the camera to be borne by the body of the photographer, and not by the hands and arms, thereby allowing the hands and arms to be free to adjust the camera when pictures are being taken.

An example of a body mounted camera support is disclosed in U.S. Pat. No. 817,207 to Wheeler. The camera support incorporates a belt having a pad mounted thereto, and a pivotable coupling mounted to the pad. A shaft having a telescoping member extends from the coupling to a head portion which includes a spindle for engaging the base of a camera. A separate neck engaging strap extends from the head of the support assembly and about the neck of the photographer. As disclosed, however, it is necessary to maintain at least one hand engaging the camera, as the camera support assembly is free to pivot relative to the belt and neck of the photographer. Therefore, this type of support does not allow the photographer to disengage the camera and have free use of both hands while the camera remains steadied.

U.S. Pat. No. 2,952,200 to Welch discloses a similar camera mounting assembly as disclosed in Wheeler. The mounting assembly of Welch includes a pistol grip which forms a portion of the head assembly to which the camera is mounted. Welch also discloses the use of an upper body encircling belt which depends to a support cup in which the lower portion of a support rod is seated, and a separate neck strap. The Welch device is inadequate, as it is necessary to keep at least one hand on the pistol grip in order to steady the camera relative to the individual.

A similar camera mount is disclosed in U.S. Pat. No. 4,687,309 to Breslau. The disclosed camera mount does not include a neck strap, and so whenever the camera is not in use, it is pivoted to suspend from a main strap which extends around the neck of the photographer. It is also necessary to utilize at least one hand to steady the camera when elevated to a use position.

U.S. Pat. No. 2,771,826 to Shapiro discloses a camera support assembly which includes a body encircling belt and a separate neck encircling strap. The base of the camera support rod is provided with a plurality of teeth which mesh with teeth provided in a clip mounted to the front of the belt. This device provides lateral stability for the base of the rod and prevents some movement of the camera support rod when the hands are released from the camera. When the camera is supported in a use position, however, side-to-side movement of the camera is possible and the camera can only be steadied by a photographer utilizing at least one hand to prevent such lateral movement. In addition, by supporting the camera from a single point of contact at the belt, there is increased stress at the point at which the belt is coupled to the base of the camera support rod. Such single point contact makes the device uncomfortable to wear, and may cause possible failure of the camera support device.

U.S. Pat. No. 4,327,986 to Carter discloses a camera support device of the type disclosed in Wheeler. In the Carter device, steadying of the camera is accomplished by providing a pair of handles which extend from the base of a camera support rod. The handles are engageable along the sides of the photographer's torso to prevent the bottom portion of the rod from swaying when the camera is elevated to a use position. With this type of assembly, should the photographer make any twisting movement of the upper torso, the camera support assembly can pivot and shift the camera from its proper position.

In addition to the known devices for supporting cameras from an individual's body, storage or carrying cases for transporting cameras have been utilized as a support to stabilize cameras during their use. Examples of such camera carrying cases are disclosed in U.S. Pat. Nos. 2,290,307 to Wicker, 2,298,144 to McNabb and 5,064,062 to Miller. None of the carrying cases disclosed in the aforementioned references are portable when the camera is in use and therefore the camera carrying cases must remain stationary to provide a stable support. McNabb discloses that the camera case may be engageable with a portion of the photographer's torso; however, the camera carrying case and the camera must be supported by the individual's hands, as no other support feature is provided for stabilizing the camera relative to the individual's body.

Other camera support devices are disclosed in U.S. Pat. Nos. 4,348,034 to Welt and 4,826,187 to Abbott et al.

In view of the above-described disadvantages of the known devices, there has been a need for a camera support for photographic, VCR, movie and other types of cameras, which is carried by a photographer, such that the photographer has both hands free either for adjusting the camera equipment or other purposes, and which provides a stable base upon which to mount the camera.

SUMMARY OF THE INVENTION

The present invention has been made in view of the above-described disadvantages associated with the known camera mounting assemblies.

It is an object of the present invention to provide a portable apparatus for supporting a camera which is carried by a photographer, and which enables the camera to be steadied during use while leaving the photographer's hands free to perform necessary adjustment to the camera or other tasks.

It is also an object of the present invention to provide a combination body worn storage and carrying case and unipod support assembly for use in stabilizing cameras of all types, so that a camera may be mounted to the carrying case being worn about the upper body of a photographer.

It is yet another object of the present invention to modify conventional hip pouches, camera bags, and other portable storage devices, to function as supports for steadying cameras during use.

The camera support in accordance with a preferred embodiment of the invention is comprised of a storage case which may be a conventional camera case, hip storage pouch, hip purse or other type of article container, and which is worn about or suspended from an individual's upper torso. The storage case includes a lid or cover which may be reinforced to provide further stability to the camera. A mounting track is secured to the lid.

The storage case is provided with a belt which is normally stored in a pocket at the rear of the storage case. The belt is adjustable and worn about the waist of an individual. Adjusting straps are preferably provided at each side of the belt to regulate the tension of the belt about the individual.

The camera support is further comprised of a camera support stand. The camera support stand is a unipod stand which includes a leg having upper and lower ends. A mounting base is provided at the lower end of the leg to detachably engage with the mounting track to support the stand from the storage case. A camera engaging head assembly is mounted to a post which is telescopically mounted within the leg. The head assembly preferably enables both rotational and pivotal adjustment of the camera relative to an individual.

When the unipod stand is removed from the storage case after using the camera, it may be stored within the storage case along with the camera and related camera equipment.

BRIEF DESCRIPTION OF THE DRAWINGS

In the accompanying drawings:

FIG. 3 is a rear perspective view of the storage case of FIG. 2 showing a rear pocket for storing the belt when not in use, and illustrating the manner of securing the mounting base to the mounting track;

FIG. 4 is a side view showing the camera stand mounted to the mounting track provided on the storage case, and a pivotable locking member which allows vertical adjustment of the camera mounting head as represented by the arrow; and FIG. 5 is a partial cross-sectional view in the direction of line 5—5 of FIG. 4.

DETAILED DESCRIPTION OF THE PREFERRED EMBODIMENT

Figure 1:
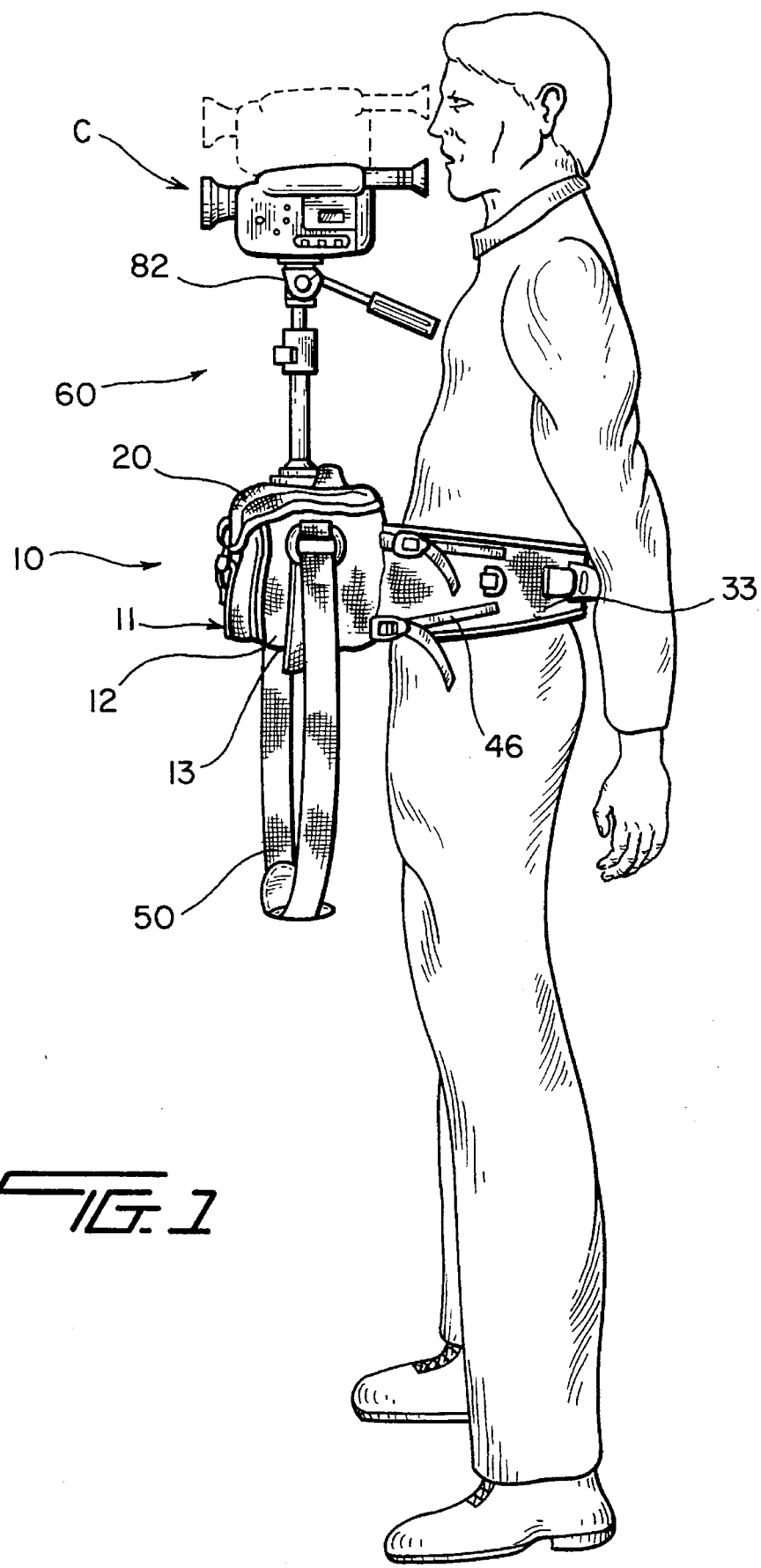
FIG. 1 is an illustrational view of a preferred embodiment of the invention being worn by a photographer and a camera mounted thereto, and also showing the relative elevational movement of the camera in dotted line.

A camera support assembly 10 in accordance with the present invention is illustrated in FIG. 1 supporting a camera "C". The illustrated camera is of the VCR type; however, any type of conventional camera may be mounted to the support assembly. As shown, the support assembly allows the photographer to stabilize the camera without having to utilize his hands, so that the hands are free to focus or adjust the position of the camera, or to perform other tasks, while the camera remains securely positioned relative to the photographer's body.

A preferred embodiment of the invention is illustrated in FIGS. 1–5. The camera support assembly 10 includes a storage and carrying case 11 having an interior storage compartment defined by opposed sidewalls 12, a bottom wall 13 and opposed front and rear walls 14 and 15, respectively. An upper opening into the storage case 11 is closed by an openable cover 16 having depending side portions 17 and 18 and a depending front portion 19.

The cover 16 further includes an upper surface 20, and a handle 21 is secured to the upper surface by fasteners 21'. The handle 21 is preferably flexible. The fasteners 21' are preferably rivets or the like to fixedly secure the handle to the cover. The fasteners 21' may optionally be snaps or the like to firmly secure the handle to the cover and also enable the handle to be detached from the cover.

The cover is locked to the front wall 14 of the storage case 11 by a pair of bayonet snap locks 22 having male locking elements 23 secured by straps 24 to the front wall 14, and female locking elements 25 secured by straps 26 to the cover 16. The male locking elements 23 include tabs 27 which are compressed toward one another to enable the male locking elements to be inserted in, or withdrawn from, the female locking elements 25.

Referring to FIG. 3, a storage pocket 28 is secured to the rear wall 15 of the storage case 11. The storage pocket 28 has side openings 29 and 30 selectively secured by mating VELCRO™ or other hook-and-loop type fabric strips 31 and 32. A pair of opposing belt portions 33 and 34 are normally stored within the pocket 28. The belt portions are shown in an extended position for mounting about the waist of an individual, such as in FIG. 1. Belt portion 33 includes a male locking member 35 having a pair of yieldable locking tabs 36. The tabs 36 are insertable within an associated female locking member 37 mounted to the belt portion 34 to lock the belt sections to each other. The locking members 35 and 37 are secured to the respective ends of the belt portions 33 and 34 by straps 38 and 39, respectively. The straps 38, 39 extend through openings 40, 41, respectively, formed in the base of the respective locking elements 35 and 37, to permit adjustment of the locking members to lengthen or shorten the belt portions 33 and 34. As shown in FIG. 1, the locking members 35 and 37 engage at the rear of the user's waist.

Figure 2:
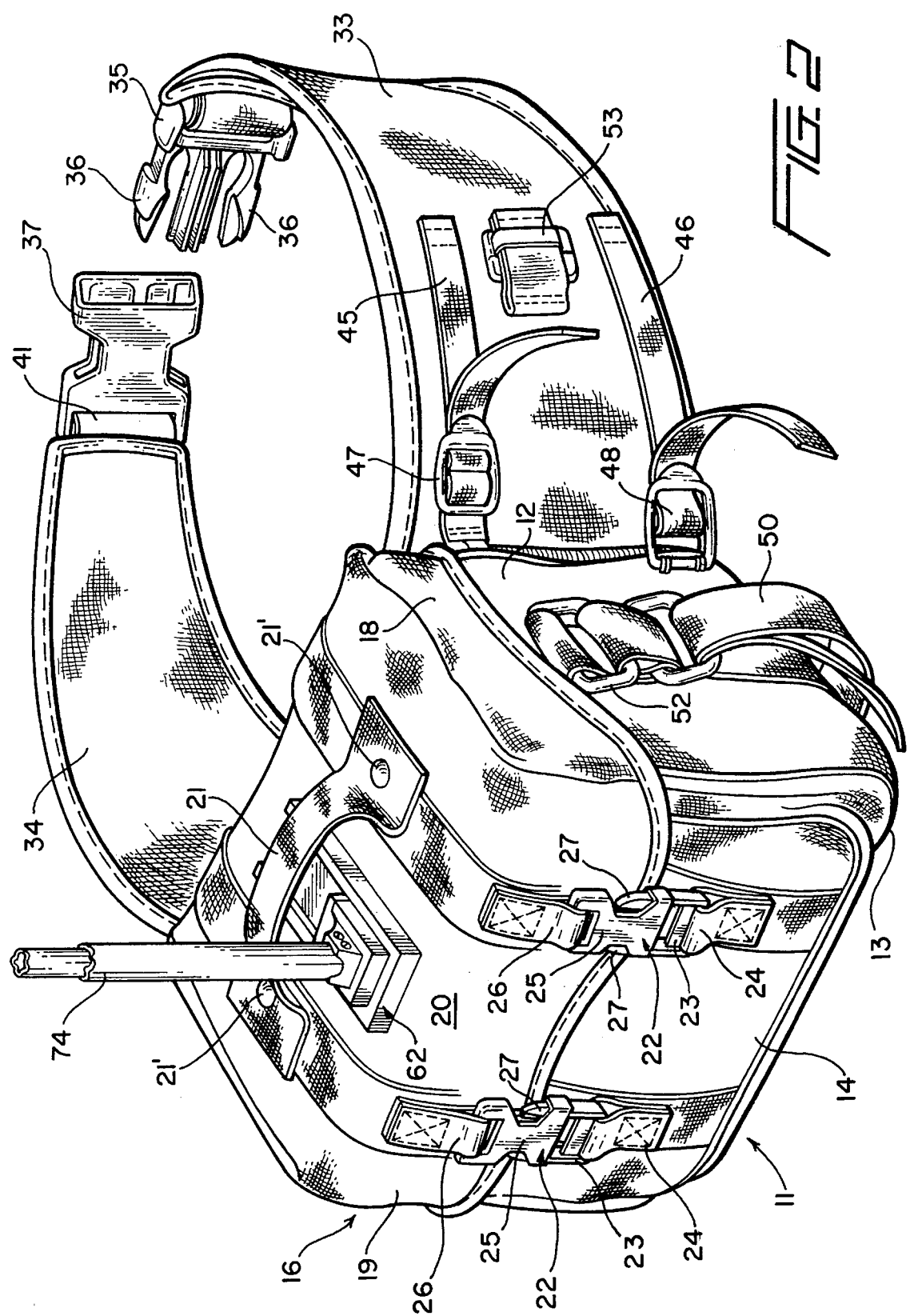
FIG. 2 is a front perspective view of a storage case and mounting belt in accordance with a preferred embodiment of the present invention.

Referring to FIG. 2, upper and lower adjusting straps 45 and 46 are located on the outer surface of the respective belt portions 33 and 34, to provide further adjustability and tension to secure the storage case 11 to the individual's body. The adjusting straps 45 and 46 have free ends which extend through respective slide locks 47 and 48, so that when the free ends are pulled relative to the slide locks, additional tension is applied to the individual's body.

The storage case 11 also preferably includes a shoulder strap harness 50 which is mounted to ring elements 51 and 52 secured to the side walls 12 of the case. In addition, rings 53 are provided along the belt portions 33 and 34 for suspending various items.

With reference to FIG. 5, at least the cover 16 of the storage case 11 may include a reinforcing panel 55 below the upper surface 20 to enhance the rigidity to the cover 16. The side, front and rear walls may be similarly reinforced (not shown), and the interior of the carrying case may have a fabric inner liner (not shown). The interior of the storage case may be compartmentalized (not shown) for separating a stored camera, camera equipment and a camera stand or unipod assembly 60 associated with the camera support assembly 10 of the present invention.

To support the unipod assembly 60 relative to the storage case 11, a mounting track 62 is fixedly secured to the upper surface 20 of the cover 16 by fasteners 63. Referring to FIG. 3, the mounting track is generally elongated and is comprised of opposed side flanges 64 and an end flange 66. The side flanges each have an open end so as to define a mounting track opening 68.

The unipod assembly 60 further comprises a mounting base 70 comprised of opposed flat portions 72 which are slidingly inserted in the mounting track opening 68 as depicted in dotted line in FIG. 3, a shoulder 73 which abuts the open end of the mounting track when the mounting base 70 is fully received as shown in FIG. 4, and an upstanding leg 74 secured at a lower end to the mounting base 70. The mounting base is preferably perpendicular to the leg. The mounting base and the mounting track are preferably composed of a plastic material. The handle 21 may be temporarily detached from the storage case in those instances when the fasteners 21' are snaps or the like, before the mounting base is inserted in the mounting track.

A collar 76 is disposed at the upper end of the leg 74 and a support post 78 is telescopically received within the collar 76 and the leg 74. The leg and the post are preferably composed of a lightweight metal or plastic material which provides sufficient rigidity to stabilize the camera.

The support post 78 is vertically adjustable with respect to the leg 74 as indicated by the arrow "V" in FIG. 4, and may be locked in a selected vertical position by a pivotable lock 80 provided on the collar 76. When the lock 80 is moved to the illustrated dotted line position 80', the post 78 can be raised or lowered within the leg. When the post is in a desired position, the lock 80 is moved to the full line position to lock the post in the desired position.

A camera support head assembly 82 is mounted to the upper end of the post 78. The support head assembly includes a horizontally rotatable collar 84 to enable adjustment of the camera in a plane approximately perpendicular to the axis of the post. A pivot shaft 86 is provided to enable the support head assembly to be pivoted forwardly and rearwardly relative to the post 78. A clamping element 88 is controlled by screwing a handle 90 in reverse directions "H" to vary the clamping force applied to the pivot shaft 86. By reducing the clamping force, the head assembly may be pivoted about the shaft.

The upper portion of the support head assembly 82 forms a base 92 for supporting the bottom of the camera "C" (FIG. 1), which is threadingly engaged to a spindle 94 extending upward from the base 92.

With reference to FIG. 1, when the unipod stand 60 is mounted to the upper surface 20 of the storage case 11, the photographer can position the camera by adjusting the head assembly 82 carried by the post 78. The photographer need not stabilize the camera with his or her hands and therefore the hands are free to manipulate the camera or to perform other tasks.

When the camera is no longer being used, it is simply detached from the spindle 94. The post 78 is then vertically collapsed into the support leg 74 by releasing the locking element 80 and the mounting base 70 is disengaged from the mounting track 62. The unipod assembly may then be placed within the storage or carrying case 11 along with the camera. The belt portions 33 and 34 of the carrying case are tucked within the rear pocket 28.

In accordance with the invention, the storage or carrying case may be formed of different materials including leather, simulated leather, canvas and cloth, and may be reinforced as described above. The camera assembly can be used with conventional hip pouches, camera carrying cases, belt mounted purses and like storage or carrying cases, as modified to be worn on the upper body of an individual and to include a mounting track for engaging the mounting base of the unipod assembly.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. An apparatus for supporting a camera in a stable position from an individual's torso, comprising:

a storage case having an upper surface, opposed sides and front and rear surfaces, a belt secured to said storage case for attaching said storage case to the individual's torso, and a track attached to said upper surface, said track including opposed flanges defining an open end; and a unipod stand including a leg having an upper end and a lower end, a post telescopically mounted within said leg, said post having an upper end, camera engaging means mounted to said upper end of said post, a base mounted to said lower end of said leg, said base including opposed flat portions slidingly insertable through said open end such that said opposed flat portions underlie said opposed flanges and said shoulder abuts said open end to mount said stand to said storage case.

2. The apparatus of claim 1, wherein said post is vertically adjustable with respect to said leg, and comprising means for selectively locking said post in a vertical position.

3. The apparatus of claim 2, wherein said camera engaging means comprises a head assembly which is rotationally and pivotally mounted to said post, and said head assembly comprises means for securing the camera thereto.

4. The apparatus of claim 1, wherein said storage case comprises a pocket mounted to said rear surface, said belt comprises first and second portions which extend outwardly from said storage case, each of said first and second portions having an outer end, means for selectively securing the outer ends to one another, and said first and second portions being receivable within said pocket.

5. The apparatus of 4, wherein said pocket comprises opposed end portions each define an opening, and means for selectively closing each of the openings.

6. The apparatus of claim 5, comprising an adjusting strap connected to each of said first and second portions of said belt, and means for adjusting the length of the straps.

7. The apparatus of claim 6, wherein said storage case comprises a pocket mounted to said rear surface, said belt comprises first and second portions which extend outwardly from said storage case, each of said first and second portions having an outer end, means for detachably securing the outer ends to one another, and said first and second portions being receivable within said pocket.

8. The apparatus of claim 7, comprising an adjusting strap connected to each of said first and second portions of said belt, and means for selectively adjusting the length of the straps.

9. An apparatus for supporting a camera in a stable position from an individual's torso, comprising:

a storage case having opposed side walls, and front and rear walls, a belt extending from said storage case for attaching the storage case to the individual's torso, and a track fixedly mounted to said upper reinforced surface said track including opposed flanges defining an open end; and a unipod stand including a leg having an upper end and a lower end, a post received within said leg, a camera mounting means mounted to said post for mounting said camera relative to said post, a base disposed at said lower end of said leg, said base including opposed side portions slidingly insertable through said open end so as to underlie said opposed flanges of said track to mount said stand to said storage case.

10. The apparatus of claim 9, wherein said stand includes a collar connected to said leg, and means provided on said collar for locking said post in a selected position relative to said leg.

11. The apparatus of claim 10, wherein said base comprises a shoulder which abuts said open end of said track when said base is received in said track.

* * * * *